United States Patent [19]

Berger, Jr. et al.

[11] Patent Number: 4,493,717
[45] Date of Patent: Jan. 15, 1985

[54] IN-LINE DISPOSABLE FILTER

[76] Inventors: L. Joseph Berger, Jr., 19661 Beverly Rd.; Denis D. Guequierre, 320 Argyle, both of Birmingham, Mich. 48009

[21] Appl. No.: 375,536

[22] Filed: May 6, 1982

[51] Int. Cl.³ ............... B01D 50/00; B01D 46/24
[52] U.S. Cl. ......................... 55/330; 55/492; 55/502; 55/503; 210/304; 210/448
[58] Field of Search ............ 55/330, 335, 379, 492, 55/498, 500–503; 210/304, 446, 448

[56] References Cited

U.S. PATENT DOCUMENTS

| 3,071,251 | 7/1963 | Szwargulski | 210/446 |
| 3,317,043 | 5/1967 | Vanderpoel | 210/448 |
| 3,397,794 | 8/1968 | Toth et al. | 210/446 |
| 3,815,744 | 6/1974 | Vanderpoel | 210/448 |
| 4,062,781 | 12/1977 | Strauss et al. | 55/501 |
| 4,063,913 | 12/1977 | Kippel et al. | 55/498 |
| 4,256,474 | 3/1981 | Berger, Jr. et al. | 55/503 |

Primary Examiner—David L. Lacey
Attorney, Agent, or Firm—Hill, Van Santen, Steadman & Simpson

[57] ABSTRACT

The specification discloses an improved in-line disposable filter for sub-micron filtration having a two-piece filter housing permanently and sealingly joined together, and having an inlet and an outlet for media to pass therethrough, said filter housing containing on the interior a resin bonded glass fiber filter tube fitted over a support core which is located in place by one end of the filter housing and, when assembled, compresses the resin bonded glass fiber filter tube between serrations on the support core and the end wall of one of the pieces of the filter housing.

8 Claims, 4 Drawing Figures

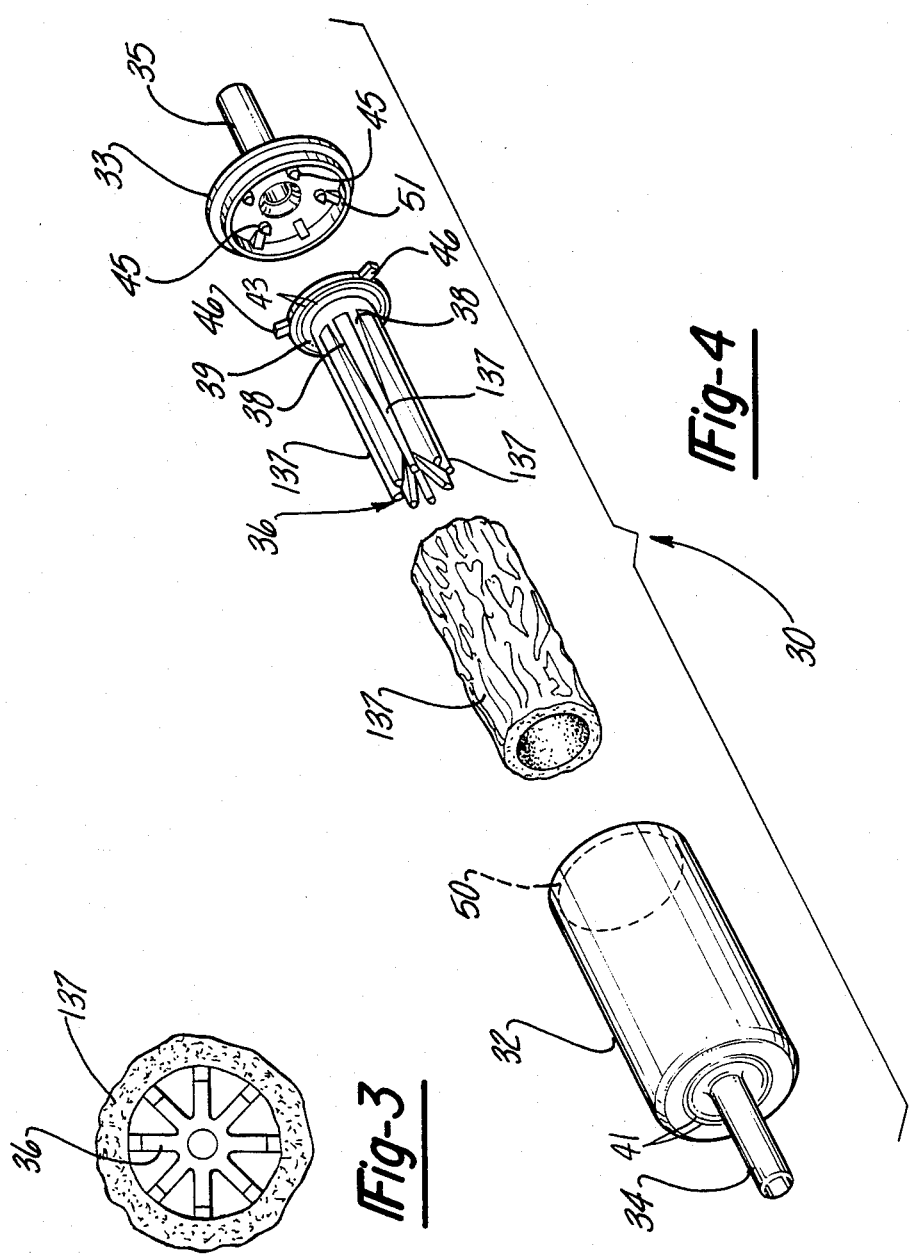

4,493,717

IN-LINE DISPOSABLE FILTER

The present invention relates to in-line filter housings and, more particularly, to an improved in-line disposable filter housing of the type used to provide what is known in the art as "instrument air", which refers to air which has been passed through a high efficiency submicron in-line filter immediately upstream of the instrument using the air, to make it free of particulates and aerosols for the protection of precision components, such as sensors and critical analyzer components, robot and air control circuitry, and other applications known as microsystems.

Applicants are experienced in the field of in-line filters, and where a disposable filter element is desirable, have patented the filter shown in U.S. Pat. No. 4,256,474 entitled "Filter Housings and Filter Assemblies Utilizing the Same". However, in many applications, for example out in the field where clean air is required, and for one reason or another, it is not desirable to have the field personnel disassemble the filter housing insert a filter element, and reseal the filter housing, it is desirable to have disposable in-line filters.

One such prior art filter is shown in FIG. 1, and includes a filter housing generally designated by the numeral 10 having a female portion 11 and a male portion 12, each having a corresponding inlet into the interior chamber of the filter housing, with the female inlet being indicated by the numeral 13, the male inlet being indicated by the numeral 14, and the interior chamber indicated by the numeral 15. It should be understood that the female inlet 13 or the male inlet 14 could also be used as an outlet because the prior art filter can be used to filter from the interior to the exterior of the filter tube 16, in which case the female inlet 13 would be the inlet for the filter media and the male inlet 14 would actually be serving as the outlet.

In the reverse situation, the male inlet 14 would be the inlet, and the female inlet 13 would actually be serving as the outlet for the filter.

The female portion 11 has a plurality of centering projections 17 extending into the interior of the chamber 15 to serve as a guide for the filter tube 16, with the left-hand end of the filter bearing against the female end wall 18. A plurality of annular serrations 43 are provided on the end wall 39 to seal the end of the filter tube.

The male portion 14 of the filter housing 12 also has support projections 19 which bear on an end cap 20. The end cap 20 has axially extending projections 21 to act as a guide for the filter tube when the filter housing is assembled. If the dimensions are chosen correctly, the support projections 19 acting on the end cap 20 will compress the filter tube between the end cap end walls 20A and the female end wall 18. This filter is satisfactory for many purposes. However, it also has some serious disadvantages.

First of all, virtually the entire inner length of the filter tube is unsupported and, while this is not critical in larger filters having thicker wall filter tubes, in small in-line filters where high velocities and differential pressures may be present, it can provide a limiting factor.

Secondly, if the tube is flowed from outside to inside, there are two rather abrupt cross-sectional area changes in the air flow path which cause increased pressure drop. The fact that the end cap 20 and support projections 19 are needed also greatly reduces the tube size, and an undesirable loading condition can exist immediately adjacent the ends of the centering 17 or support 19 projections, whichever are nearer the inlet of the filter, which will cause reduced filter life.

Therefore, it is one of the objects of the present invention to provide an improved in-line disposable filter having a maximum tube size in relation to the size of the filter housing.

It is a further object of the present invention to have a disposable in-line filter housing having an inner support core providing support for the entire inside surface of the filter tube to create a much higher collapse resistance than heretofore available.

It is a further object of the present invention to provide a disposable in-line filter housing which provides for self-centering of the filter tube in the housing and maintenance of that position.

It is a still further object of the present invention to have the internal volume of the filter housing in relation to a desired filter capacity reduced as much as possible.

It is a further object of the present invention to have the ends of the filter tubes sealed by serrated end seals.

It is a still further object of the present invention to provide an in-line filter housing having an increase in the allowable pressure drop across the filter tube compared with the prior art filters.

It is a still further object of the present invention to have a filter support for the filter tube which, by virtue of its design, will cause the filter tube to load more uniformly along its length and therefore increase the filter life.

It is a still further object of the present invention to provide an improved in-line disposable filter housing which, if mounted vertically with inlet upward, provides a dropout chamber which can gravitationally collect debris by stagnation of the flow velocity without restricting critical flow orifices necessary to provide optimum flow capacity.

Further objects and advantages of the present invention will be apparent from the following description and appended claims, reference being had to the accompanying drawings forming a part of this specification, wherein like reference characters designate corresponding parts in the several views.

FIG. 3 is a sectional view taken in the direction of the arrows along the section line 3—3 of FIG. 2.

FIG. 4 is an exploded assembly view of the present invention.

Figure 1:
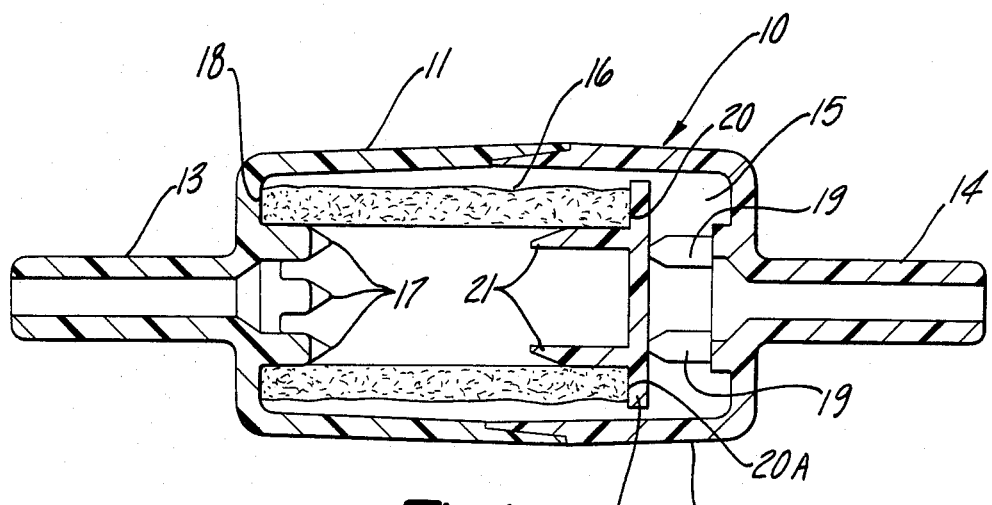
FIG. 1 is a sectional view of a known prior art filter.

It is to be understood that the present invention is not limited in its application to the details of construction or arrangement of parts illustrated in the accompanying drawings, since the invention is capable of other embodiments, and of being practiced or carried out in various ways within the scope of the claims. Also it is to be understood that the phraseology and terminology employed herein is for the purposes of description and not of limitation.

Applicants, in their attempt to eliminate the problems discussed in connection with the prior art and arrive at an improved in-line disposable filter, have arrived at the construction shown in FIGS. 2-4.

Referring first to FIG. 4, it can be seen that the filter assembly, generally designated by the numeral 30, includes a filter housing generally designated by the numeral 31 (FIG. 2) and consists of a female portion 32 and a male portion 33. The female portion 32 has a female inlet and/or outlet 34, while the male portion 33 has a male inlet and/or outlet 35. These are called inlets and/or outlets because, as in the prior art filter, in the present invention the flow can flow in either direction, so what is an inlet for in-to-out flow becomes an outlet for out-to-in flow. However, in the preferred embodiment of our filter, to be explained later, in most cases it is preferred that the flow be from the outside of the filter tube to the inside, or from the left to the right in FIG. 2. The filter assembly 30 is completed by having a ribbed support structure 36 over which closely fits the filter tube 37.

In contrast to many general filtering applications with low differential pressure across the filter tube in the neighborhood of 6–8 p.s.i., where no support for the resin reinforced glass filter tubes are needed, in submicronic filtering applications of the small tubular in-line type, rather large pressure differentials (up to 50 p.s.i.) are to be expected, and are one of the factors dictating the use of an internal tube support.

Another factor is the sensitivity of the instruments on which the filters are used. Such instruments are very sensitive to sudden increases in pressure, and the rupture of a filter tube because of improper or insufficient tube support can completely ruin the instrument. Therefore, in contrast to the prior art discussed above, the entire length of the tube 37 in the present invention has been supported by the ribbed support structure 36. This increases the out-to-in differential pressure resistance across the tube in comparison with the prior art filters by four times, and substantially reduces the internal volume of the housing because of the fact that our ribbed support structure is especially designed to occupy a minimum amount of space.

In order to accomplish this, Applicants made several attempts and finally came up with the design shown which has a plurality of ribs over which fits the filter tube 37. However, it is to be noted of special interest is the fact that between the ribs 137 are a plurality of identical axially tapering wall surfaces 38.

Figure 2:
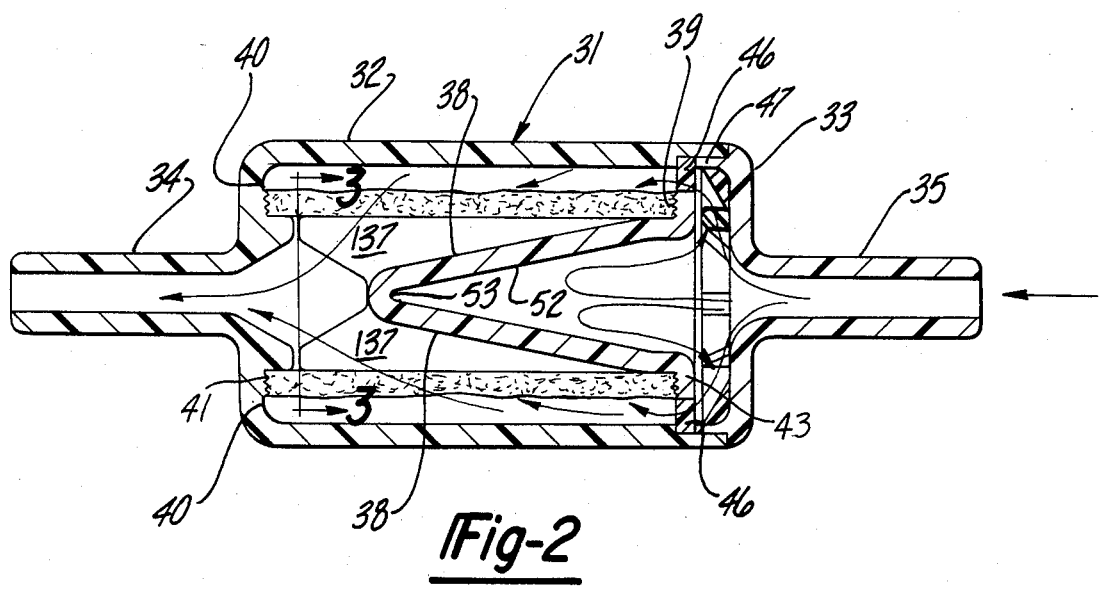
FIG. 2 is a comparable sectional view of a construction embodying the present invention.

After quite some experimentation it was found that providing the axially tapered wall surfaces 38 between the ribs 137 made it possible to have the ribs thinner than otherwise possible, but still have the same strength therein, so that less of the interior wall area of the filter tube 37 would be occupied, and at the same time the problem of how to avoid uneven loading of the filter would be solved because referring to FIG. 2, and assuming the preferred out-to-in flow, it can be seen that immediately adjacent the support structure end wall 39 there will be a higher back pressure or resistance to flow than adjacent the female portion end wall 40. A plurality of annular serrations 41 are provided in the end wall 40 to seal the end of the filter tube. Thus, the areas nearest the inlet for the media will not have as great a quantity of flow as the areas nearest the outlet so that the loading of the filter will be uniform and the filter tube life therefore would be extended over the prior art filters. Applicants consider this one of the most important advances which their invention makes over the prior art filter.

Another important advance is the positive locating of the filter tube 37 within the filter housing 31. It can seen that Applicants' tube is positively located, in contrast to the prior art filter in which the end cap 20 merely rests on the support projections 19 and is subject to dislodgment because of vibration, flow velocities, etc.

In Applicants' construction, while a plurality of axially extending projections 45 maintain pressure on the support structure 36 by virtue of contact with the support structure, it can be seen that a plurality of radial projections 46 positively locate the support structure 36, and the combination of the axial projections 45 and radial projections 46 lock the support structure 36 in place and prevent axial or radial movement.

The radial projections 46 are prevented from moving in an axial direction by virtue of the fact that are entrapped between the annular recess 50 provided on the female portion 32 of the filter housing 31, and the annular ledge 47 provided on the male portion 33 of the housing 31. It can be seen that when the filter 37 is inserted over the support structure 36, and the support structure 36 is placed in the female portion 32 of the housing, the radial projections 46 fit into the annular recess 50 and are entrapped by the annular ledge 51 when the male portion 33 is permanently assembled to the female portion 32 by the preferred method of ultrasonic welding. This positive location speeds assembly times, reduces scrap, and guarantees overall quality.

It should be understood that many means of permanently fastening the two halves of the housing together are available, such as gluing, cementing, the use of solvents, the use of adhesives, as well as the process of ultrasonic welding. However, for a fast, inexpensive, and very reliable type of method for joining the two halves of the filter housing together. We prefer the ultrasonic welding technique. It is not believed necessary to describe this technique in detail, as it is well known to those skilled in the art.

A further advantage of the present invention over the prior art can be seen if the inlet and/or outlet 35 is treated as an inlet and placed vertically. Thus, the flow would then strike the interior wall 52 of the ribbed support structure 36 before reversing itself and continuing its path of flow. It is believed that when the filter is mounted vertically and the flow comes in contact with the wall, any particles in the air will become dislodged and will, because of gravity, fall to the lower end 53 of said interior wall 52 and remain trapped there because of the dead zone which will be created by the flow reversal.

Also, because of the design of the interior wall and the fact that the 180° flow reversal takes place interiorly of the ribbed support structure 36, the tube size can be maximized without interfering with the flow about the tube. Our design of the ribbed support structure maximizes tube size, and out tubes are approximately 25% larger than those found in comparable prior art housings. Since filter life is in direct proportion to tube size, our disposable filter assembly also lasts much longer than prior art designs.

Also, when the filter assembly is used in the preferred flow direction with flow from the outside to the inside of the filter tube whether mounted vertically to take advantage of the impact dropout chamber provided by the interior wall 52, or horizontally, the loading of the filter will take place on the outside of the filter tube, and can be visually observed. The preferred flow direction is from the outside to the inside of the filter tube for several reasons. The tube loading surface is larger, the pore profile makes this direction more efficient, the dirt collecting on the filter surface can be observed, and the filter tube will load more uniformly along its length. It should be understood that because of the support provided by the ribbed support structure, the maximum differential pressure which can be accommodated is the same in both directions, such pressure being in the neighborhood of 70 p.s.i.

Thus, by abandoning conventional constructions for sub-micron disposable in-line filters, and instead providing a new and novel construction for such filters having a positively located support structure giving 100% tube support, we have solved many long standing problems in the art.

We claim:

1. A filter assembly including:
   (a) a filter housing having a fluid inlet and a fluid outlet,
   (b) a filter tube mounted within said filter housing between said inlet and outlet, and
   (c) a ribbed support structure permanently mounted within said housing and supporting said tube along substantially its entire length,
   (d) said housing comprising a female portion and a male portion permanently joined together,
   (e) an annular recess at one end of said female portion, said male portion having an annular ledge at one thereof and extending into said annular recess,
   (f) said ribbed support structure being connected to the interior of said filter housing and comprising a plurality of axially and radially extending ribs supporting said filter tube and having axially tapered wall portions between said ribs, a support structure end wall provided at one end of said ribbed support structure, said end wall having a plurality of annular serrations provided thereon, said serrations engaging an end of said filter tube, and a plurality of radial projections, said radial projections being located between said annular recess and said annular ledge.

2. The filter assembly according to claim 1 wherein said male portion has a plurality of axial projections contacting said support structure end wall so as to provide a positive force thereupon.

3. A filter assembly including:
   (a) a filter housing having a fluid inlet and a fluid outlet,
   (b) a filter tube mounted within said filter housing between said inlet and outlet, and
   (c) a ribbed support structure permanently mounted within said housing and supporting said tube along substantially its entire length,
   (d) said housing comprising a female portion and a male portion permanently joined together, and
   (e) including a plurality of annular serrations on said female portion, said serrations engaging an end of said filter tube.

4. A filter assembly according to claim 3 including a plurality of annular serrations on said male portion, said serrations engaging an end of said filter tube, whereby said filter tube is positively and sealingly located between said serrations on said female portion and said serrations on said male portion, with a sealing force being provided by said axial projections slightly compressing said filter tube.

5. The filter assembly according to claim 4, wherein said ribbed support structure has a tapered interior wall in flow communication with the fluid inlet to trap particulate debris when said filter assembly is mounted vertically.

6. The filter assembly according to claim 5 wherein said tapered interior wall is provided with an end portion to collect said debris.

7. A filter assembly including:
   (a) a filter housing having a fluid inlet and a fluid outlet,
   (b) a filter tube mounted within said filter housing between said inlet and outlet, and
   (c) a ribbed suport structure permanently mounted within said housing and supporting said tube along substantially its entire length,
   (d) said ribbed support structure supporting said filter tube and comprising an axially tapered wall surface within said filter tube and positioned and arranged in flow communication with said inlet so as to control the cross-sectional area of a fluid flow between said inlet and said outlet, whereby the flow through said filter tube is greater near said outlet than said inlet, and the loading of the filter is substantially uniform.

8. The filter assembly including:
   (a) a filter housing having a fluid inlet and a fluid outlet,
   (b) a filter tube mounted within said filter housing between said inlet and outlet, and
   (c) a ribbed support structure permanently mounted within said housing and supporting said tube along substantially its entire length,
   (d) said ribbed support structure comprising a cup-like interior wall mounted within said filter tube, with said cup-like wall in flow communication with said inlet and opening toward said fluid inlet, whereby at least a portion of the fluid flowing through said inlet reverses its flow direction within said housing before flowing through said filter tube.

* * * * *